Dec. 22, 1936.  R. K. LEE  2,065,080
MOTOR VEHICLE
Filed May 3, 1933
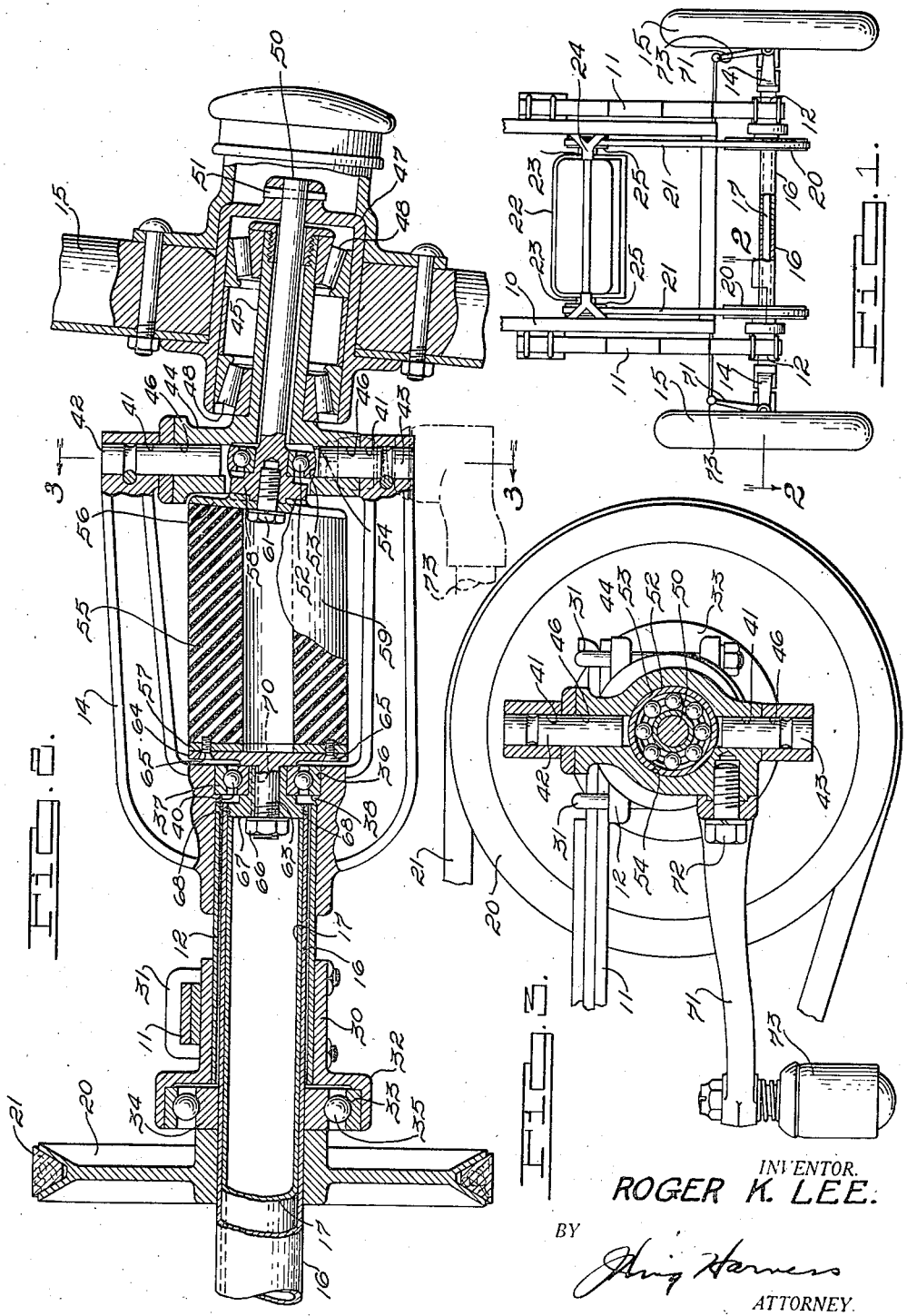
INVENTOR.
ROGER K. LEE.
BY
*Jhing Harness*
ATTORNEY.

Patented Dec. 22, 1936

2,065,080

UNITED STATES PATENT OFFICE 2,065,080

MOTOR VEHICLE

Roger K. Lee, Highland Park, Mich., assignor to Chrysler Corporation, Detroit, Mich., a corporation of Delaware Application May 3, 1933, Serial No. 669,113

10 Claims. (Cl. 180—43)

This invention relates to motor vehicles and more especially to that type thereof in which both driving and steering is accomplished through the front wheels, the principal objects of the invention being the provision of a new and novel drive connection between the front wheels and the rotor piece of a vehicle.

Another object is to incorporate between the motor and the front wheels of a vehicle, simple and efficient means for effecting drive connections while permitting a certain amount of relative rotation of the front wheels.

Another object is to reduce the number of universal joint connections required in the drive connections between the motor and steerable front wheels of a motor vehicle.

Another object is to simplify the arrangement and construction of parts of the drive connection between the motor and steerable front wheels of an automobile.

Another object is to provide a simplified axle construction for motor vehicles.

Another object is to reduce the transmission of vibration and road shock through the drive connections of a motor vehicle.

Another object is to reduce the size of the axle and wheel spindle connections for front wheel drive motor vehicles.

Other objects and advantages will become apparent from the following description and appended claims.

For the purpose of illustrating the genus of the invention, a typical concrete embodiment is shown in the accompanying drawing, in which:

Figure 1 is a more-or-less diagrammatic top plan of the front end of the chassis of a motor vehicle embodying drive connections according to the present invention;

Fig. 2 is an enlarged section taken on the line 2—2 of Fig. 1; and

Fig. 3 is a section, on a still larger scale, taken on the line 3—3 of Fig. 2.

In the conventional front wheel drive constructions, the axle assemblies have usually included a differential mechanism fixed to the frame of the vehicle and one, two or three universal joints in the lines of shafting extending between the differential mechanism and each of the front wheels. One or two universal joints in the lines of shafting between the differential mechanism and each of the front wheels, have been found insufficient for practical purposes in that too rapid wear and too high stresses occur during operation of the vehicle. This is due to the fact that when the wheels are turned during steering operation at considerable angles with respect to the frame of the vehicle, and at the same time the line of shafting is moved in a vertical plane during swinging of the vehicle, the angularity of the wheel joints become so great that undue stresses are set up in it during transmission of power therethrough. While three universal joints in each line of shafting between the differential mechanism and each front wheel renders impossible sharp angular positions of the parts of the shafts at the wheel joint and at the same time causes the jointed shafts to be so yielding in a longitudinal direction that excessive breakage and wear do not occur, such constructions must include a differential mechanism and at least six universal joints in the axle assembly. The latter construction, even though the differential mechanism is carried by the frame, adds a large amount of unsprung weight to any motor vehicle, and in the case of a small light weight car, the unsprung weight occasioned by such a construction would be so out of proportion to the weight of the vehicle as to render impractical the incorporation of this type of drive construction therein. The unsprung weight of any vehicle should be kept down to a minimum to save wear and tear on the tires and to permit control of the vehicle while traveling at high speeds.

The present invention contemplates the provision of a flexible drive connection between the motor and independently operable shafts forming parts of an axle which maintain themselves in a straight line between the axle yokes, these shafts each being connected through a single universal joint to a front wheel. The universal joints are made flexible in angular directions and yieldable longitudinally of the shaft so as to preclude breakage. The universal joints are also torsionally yieldable so as to permit a certain amount of relative rotation of the wheels so that when employed in conjunction with flexible drive connections between the engine and the independently operative shafts, other differential mechanism will not be required. The universal joints also provide yieldable parts rather than relatively movable and mechanically engaged parts so that little or no wear of parts occurs.

Referring to the drawing, and more particularly to Fig. 1, the numeral 10 designates the frame of a motor vehicle to which is attached a pair of semi-cantilever or quarter-elliptic springs 11 extending forwardly of the frame and attached at their front ends to a pair of sleeve-like support members 12. The semi-cantilever type of springs permit very little side sway and require no shackles. A pair of yokes 14 are secured to the outer ends of the sleeve members 12 and constitute the axle yoke in which the spindles of the front wheels 15 are pivoted. A pair of independently rotatable tubular shafts 16 are journaled in the sleeve members 12 and arranged in end-to-end relation upon a cylindrical shaft 17. Neither of the tubular shafts 16 is connected to the cylindrical shaft 17 nor to the other tubular shaft. The cylindrical shaft 17, however, does make a fairly close fit with the tubular shafts 16 so that this assembly maintains itself in a straight line. The sleeve-like support members 12 are journaled on the tubular shafts 16 to suitable bearings to maintain the sleeve members in desired alignment with respect to the tubular shafts 16 and to the cylindrical shaft 17 to maintain the yokes 14 in fixed alignment and to provide a shaft assembly which maintains itself in a straight line between the axle yokes 14. A drive pulley 20 is fixed to each of the tubular shafts 16 and the tubular shafts are connected through a flexible connection to the wheels 15 to operate the latter in a manner which will later be described more in detail. The drive pulleys 20 are connected by belt means 21, preferably in the form of V belts, to driving elements operated by the motor 22 of the vehicle. Preferably, these driving elements are movable forwardly and rearwardly of the vehicle to vary the tension upon the belt means 21 to connect or disconnect the drive between the motor 22 and the wheels 15 of the vehicle.

The control of the drive connection between the motor 22 and the wheels 15 of the vehicle may be effected through speed reduction, clutch and transmission mechanism or may be effected in a simple manner by disposing the motor 22 with its crank shaft 23 arranged at the bottom of the engine and transversely of the frame 10 and pivotally connecting the upper portion of the motor 22 to an upwardly extending support 24 fixed to the frame 10. The specific drive connections and units employed between the motor and the crank shaft 23 may be extended beyond each side of the motor 22 and upon the ends of which are fixed the drive pulleys 25 arranged in alignment with the drive pulleys 20 fixed to the tubular shafts 16, each pair of pulleys 25 and 20 being connected by a flexible belt 21. The tension on the belt 21 may be varied by swinging the bottom portion of the engine 22, and the pulleys 25 carried thereby, about the pivotal connection between the engine and the support 24 to control the application of power from the motor 22 to the wheels 15 of the vehicle. The specific arrangement of the motor and drive connections and units employed between the motor and axle shafts may be varied widely without exceeding the scope of the invention, the above described means being given as one of the simplest possible arrangements for the purpose.

Referring to Figs. 2 and 3 of the drawing, the wheel and axle assembly, shown in Fig. 1, will be explained more in detail. A bearing holder 30 is secured in fixed relation to the inner end of each of the sleeve-like support members 12 and the body portion of this bearing holder provides a spring seat to which the front ends of the springs 11 are secured by means of spring clips 31. The inner end of the bearing holder 30 is enlarged as indicated at 32 for the reception of the outer race 33 of a bearing 35. The inner race 34 of bearing 35 is secured in fixed relation to one of the tubular drive shafts 16. The pulleys 20 are fixed to the tubular drive shafts 16 in abutting relation with respect to the inner race 34 of the bearing 35.

The axle yokes 14 may be welded or otherwise suitably fixed to the outer ends of the sleeve-like support members 12. The body portions of the yokes are recessed as indicated at 36 for the reception of the outer race 37 of a bearing 40, a shoulder 38 being retained at the base of the recess in the body portion of the yoke 14 and against which the outer ends of the sleeve-like support members 12 and the inner faces of the outer races 37 of bearings 40 may abut. The ends of the axle yoke 14 are provided with vertically disposed and aligned openings 41 for the reception of spindle pivot pins 42 and 43. The body portion 44 of spindle 45 is also provided with vertically disposed and aligned openings 46 for the reception of the spindle pivot pins 42 and 43 in order to pivot the wheel spindles to the axle yoke. The spindles 45 are inclined downwardly and outwardly with respect to a line normal to the axes of the pivot pins 42 and 43 so as to afford a suitable camber of the front wheels of the vehicle. The cambering of the front wheels of a vehicle is to make the center line of the spindle pivot pins 42 and 43, if projected downwardly, intersect as near as practical the center of contact of the tires of wheels 15 with the ground. It is also noted that the front wheels of a vehicle have a tendency to spread at the bottoms and draw closer together at the tops when speeding due to deflection of the axle and takeup of play between parts of the wheel and axle assembly so that the cambering of the wheels is made slightly greater than that required for a vehicle at rest. The purpose of cambering of the front wheels of a vehicle is to make steering easier.

The hubs 47 of wheels 15 may be journaled on the outside of the spindles 45 through the intermediary of suitable bearings 48. A spindle shaft 50 is disposed within the wheel spindle 45 and secured at its outer end to the hub 47 as by means of a pin 51. The inner end of spindle shaft 50 is journaled within the body portion 44 of spindle 45 by means of a bearing 52 provided with a spherical bearing surface 53 cooperating with a correspondingly shaped bearing surface 54 in the central portion of the body 44 of the spindle. The spherical bearing surfaces 53 and 54 are formed about a center coinciding with the center of the bearing and in alignment with the axes of the spindle pivot pins 42 and 43. Each spindle shaft 50 is connected to a tubular drive shaft 16 by means of a universal joint 55.

The universal joint 55 comprises a tubular body portion 59 of rubber or other yieldable material having securely bonded thereto an outer and an inner end member or disc 56 and 57. The discs or end members 56 and 57 may be vulcanized or otherwise securely bonded to the tubular and yieldable body portion 59 of the joint 55. The discs 56 and 57 are rigidly secured to the inner end of the spindle shaft 50 and to the outer end of the tubular drive shaft 16, respectively. The disc 56 may be secured to the spindle shaft 50 by providing an enlarged portion 58 at the inner end of the spindle shaft 50 and providing radially disposed slot and key connections between the cooperating faces of the disc and the enlarged portion 58 of the spindle shafts. A bolt 61 projected through the disc 56 and threadably engaging the end of spindle shaft 50 may be provided for securing the disc and spindle shaft in assembled relation. A connecting member 63 is provided with a flange 64 which may be secured in concentric relation with respect to the disc 57 by means of screws 65. The inner end of the member 63 is threaded for the reception of a nut 66 adapted to retain a connecting member 67 in assembled relation with respect to the connecting member 63, the connecting members 63 and 67 being secured against relative rotation by means of a slot and T connection, indicated at 70. The total length of the tubular shafts 16 is somewhat greater than the length of the shaft 17 so that the outer ends of the shafts 16 project beyond the end of the shaft 17 where they enclose the connecting members 67 and are welded thereto as indicated at 68. A steering spindle arm 71 may be secured to the body portion 44 of spindle 45 by means of a bolt 72 as indicated in Fig. 3. The other end of the steering spindle arm 71 may be attached to a tie rod 73 to maintain the wheels in the desired relative alignment.

The tubular body portion 59 of the universal joint 55 is made angularly yieldable to provide a flexible connection between the tubular shafts 16 and the spindle shafts 50 which are disposed out of alignment in one plane due to the cambering of the wheels 15. During steering operations of the vehicle the tubular body portion of the universal joint 55 is deflected in another plane normal to the plane of deflection incident to the cambering of the wheels. The tubular body portion of the universal joint is made longitudinally yieldable to accommodate the deflection of the body member 59 in the two planes mentioned without imposing too great a tension on the bearing body 52. The tubular body portion of the joint 55 is also made torsionally yieldable so that a certain amount of relative rotation of the wheels 15 may occur without the use of other differential devices. It is also noted that the yieldable belt 21 will also permit a certain amount of relative rotation of the wheels 15. It is also noted that a certain amount of slippage may occur between the pulleys 20 and 25 and the belt 21 to permit a further amount of relative rotation of the wheels 15. It will also be noted that the tubular body portions 59 of the universal joints normally maintain the wheels 15 in substantially right angle positions with respect to the axles except for the allowance made for the "toe-in" and "camber" of the wheels. This is due to the restoring force of the rubber material which tends to maintain the least possible angle between the shaft sections 17 and 50 so that the body portions 59 also serve in conjunction with the spindle arms 71 and tie rod 73 as means for causing the steering wheels 15 of the vehicle to be self aligning. The tubular members 59 may be replaced if worn or damaged by rotating the shaft section 17 until the screws 65 clear the yoke 14, removing these screws and rotating the wheel spindle until the bolt 61 becomes accessible through the center of the tubular member.

It is noted that in the above construction, no universal joints are placed in alignment with the axis of the spindle pivot pins, or between the spindle pivot pins and the wheels, so that the spindle pivot pins do not need to be widely spaced, for the accommodation of universal joint part or parts interconnecting universal joints. In the present construction, the central pivot pins 42 and 43 need be spaced only sufficiently to allow for the accommodation of a small bearing 52. This enables the applicant to reduce the size of the axle and wheel spindle connection for front wheel drive motor vehicles. It is also noted that in the above construction the yieldable tubular member 59 of the universal joint 55 and the yieldable belts 21 serve to reduce the transmission of vibration and road shocks through the drive connections.

As many changes could be made in the above construction and many apparently widely different embodiments of this invention could be made without departing from the scope thereof, it is intended that all matters contained in the above description or shown in the accompanying drawing shall be interpreted as illustrative and not in a limiting sense.

What is claimed is:

1. In an automotive vehicle, a wheel and axle assembly comprising an elongated cylindrical member, a pair of tubular shafts arranged in end-to-end relation on but unsecured to said member, universal joint means secured to the outer end of each tubular shaft, drive means secured to each tubular shaft, a support member journaled on each tubular shaft, an axle yoke fixed to the outer end of each support member, a wheel spindle pivotally connected to each yoke, a wheel journalled on each spindle, and a spindle shaft journalled in each spindle and connected at one end to one of the universal joints and at the other end to one of the wheels for driving the latter.

2. In combination, a motor vehicle provided with a pair of steering wheels, a motor, means for resiliently supporting said motor relative to said wheels, a pair of driving connections operable by said motor, each driving connection including belt means and flexible shafting, the flexible shafting of each driving connection including but a single universal joint having a yieldable part, said part being longitudinally, angularly and torsionally yieldable.

3. In a motor vehicle, a wheel and axle assembly comprising an elongated cylindrical member, a pair of tubular shafts arranged in end-to-end relation on but unsecured to said member, drive means secured to each tubular shaft, a support member journaled on each tubular shaft, an axle yoke fixed to the outer end of each support member, a universal joint secured to the outer end of each tubular shaft, each universal joint being arranged within one of the yokes, a wheel spindle pivotally connected to each yoke, a wheel journaled on each spindle, a spindle shaft journalled on each spindle and connected at one end to one of the universal joints and at the other end to one of the wheels for driving the latter, and a bearing for each spindle shaft arranged in said spindles at the axes of the pivotal connections between said spindles and said yokes.

4. In a motor vehicle, a frame, an engine mounted transversely of said frame, springs secured to said frame, sleeve-like support members secured to said spring, tubular shafts journaled in said sleeve member, a cylindrical member disposed in said tubular shafts for maintaining the shafts in aligned relation, a pair of pulleys mounted on said engine and operable thereby, one of said pulleys being arranged at each side of the engine, a pulley fixed to each tubular shaft in alignment with one of the pulleys mounted on said engine, a pair of belts connecting each of said last-named pulleys with one of said first-named pulleys, an axle yoke fixed to the outer end of each support member, a wheel spindle pivotally connected to each yoke, a wheel journaled on each spindle, a spindle shaft journaled in each spindle and connected to one of said wheels, and a universal joint, including an angularly and torsionally yieldable part arranged in each yoke for connecting the outer end of each tubular shaft to the inner end of each spindle shaft.

5. In an automotive vehicle, a steerable wheel having a spindle shaft, an axle assembly including a support, a driving member journaled in said support, an elongated supporting member disposed in said driving member, a resilient non-metallic joint arranged between said driving member and said spindle shaft, and means connecting said joint with said driving member and spindle shaft including a pair of plate like members each fixed to an end of said joint and said spindle shaft and driving member respectively.

6. In an automotive vehicle, a steerable wheel having a spindle shaft, an axle assembly including a support, a driving member journaled in said support, an elongated supporting member disposed in said driving member, a resilient non-metallic joint arranged between said driving member and said spindle shaft, and means connecting said joint with said driving member and spindle shaft including a pair of plate like members each fixed to an end of said joint and said spindle shaft and driving member respectively, said plate like members being arranged in non-parallel relationship.

7. In a front wheel drive for an automotive vehicle, a driving and supporting axle assembly including an outer supporting member, a driving member journaled in said outer member, an inner elongated supporting member, said members having substantially concentric axes, a steerable wheel and a support therefor having an axis non-concentric with respect to said axes, and a resilient joint arranged between said driving member and wheel support including disc like members one fixed to an end of said joint and said driving member and wheel support respectively, said discs having an axis concentric with respect to the axes of said members and the axis of said wheel support respectively.

8. In an automotive vehicle, a combined driving and steering wheel having a support member, a driving member, a non-metallic joint comprising a body of rubber having a substantially greater length than the transverse dimension thereof arranged between said members, and means connecting said joint with said members whereby said joint is axially aligned with one of said members and in misalignment with the other of said members.

9. In an automotive vehicle, a combined driving and steering wheel having a support member, a driving member, and a resilient joint arranged between said members to provide an initial camber for said wheel, said joint being freely yieldable in one plane to provide a flexible drive between said members and being freely deflectable during steering operation in another plane normal to the plane of deflection incident to the camber of said wheel.

10. In an automotive vehicle, a combined driving and steering wheel, an axle assembly including a spindle shaft, a support, a driving member, and a resilient joint comprising an elongated freely deflectable body of rubber connecting said member and said spindle shaft for transmitting a drive therebetween, said assembly being so constructed and arranged as to provide an initial camber for said wheel.

ROGER K. LEE.